July 12, 1966  
C. J. POLITIS  
3,259,942  
METHOD AND APPARATUS FOR THE  
MANUFACTURE OF CONTAINERS  
Filed Dec. 17, 1963
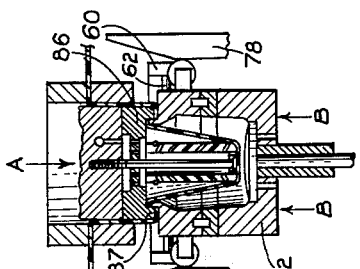
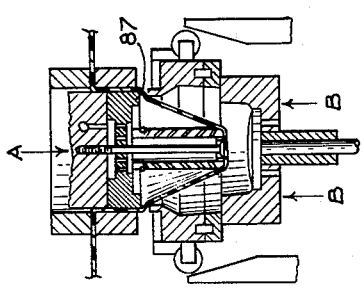
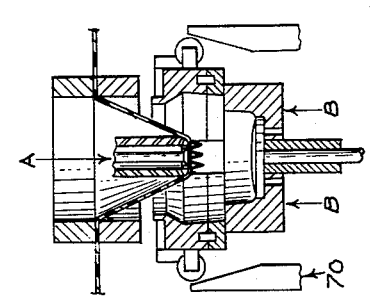
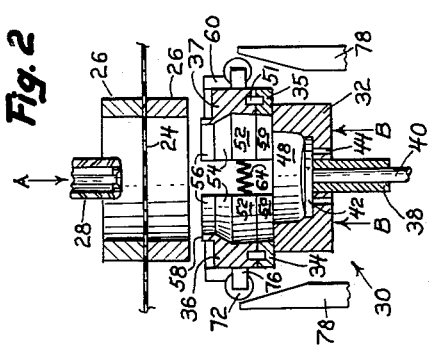
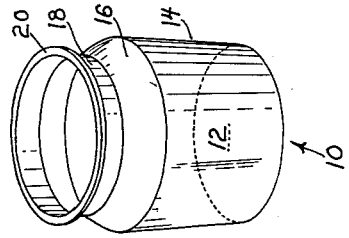
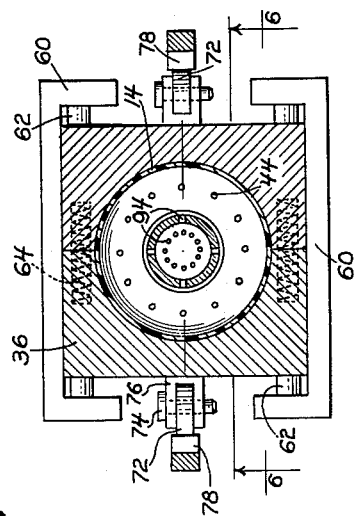
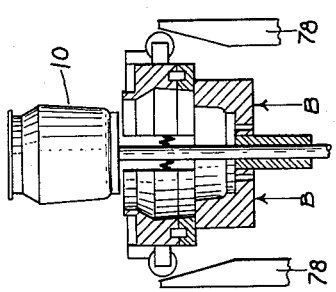
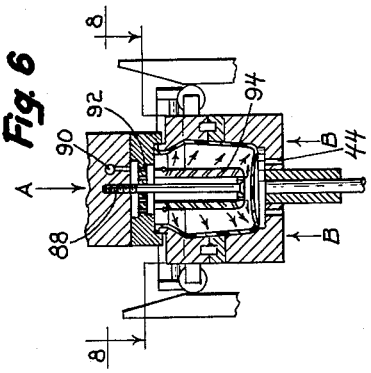
INVENTOR.  
Charles J. Politis  
BY  
His Att'y

United States Patent Office 3,259,942
Patented July 12, 1966

3,259,942
METHOD AND APPARATUS FOR THE MANUFACTURE OF CONTAINERS
Charles J. Politis, Athens, Greece, assignor to Illinois Tool Works Inc., Chicago, Ill., a corporation of Delaware
Filed Dec. 17, 1963, Ser. No. 331,178
6 Claims. (Cl. 18—19)

The present invention relates to a noval method and apparatus for forming containers or hollow articles having reduced neck portions from sheets of plastic material.

It has heretofore been proposed that hollow plastic articles having restricted neck portions be formed from multiple pieces joined together by a seam. The individual pieces are relatively shallow articles which may be formed from plastic material by mechanically shaping a sheet of the material with a plunger and pressing the material against the interior surface of a mold with the plunger. Other methods of forming shallow articles include vacuum forming and drape forming. These shallow portions are then joined by heating the various pieces and thermoplastically joining them along a parting line.

Similarly, it has also been suggested that elongated bubbles or balloons, which are preformed and heated, be inserted between totally separable complementary mold or die members and subsequently subjected to excessive internal pressures so as to cause the heated bubble or balloon to conform to the interior shape of the totally separable die members.

While these prior suggestions may be satisfactory for some purposes, it has been found that they are subject to several disadvantages. For example, the multi-piece articles have an unsightly seam which does not lend itself to an aesthetic acceptance and also provides a generally rough surface which is undesirable from a sanitation standpoint when used as a food or drink container. Many of the blow molded products, which are made from a bubble or balloon in a split die, have a heavy cross section of material at their lower end where the gravitational forces tend to concentrate the material. Additionally, both of these methods require secondary operations which add to their cost.

Methods which overcome many of the aforementioned difficulties are disclosed in my issued U.S. Patents Nos. 2,891,280 and 2,962,758. These patents disclose novel methods and apparatus for economically forming hollow articles or containers from sheet plastic material which at the same time provide articles that are sufficiently rugged and have a pleasing appearance so that they are readily marketable.

The apparatus described in my patents includes upper and lower platens movable relative to one another, heating means for controlling the temperature of the plastic sheet material, sheet feeding means for timed intermittent feeding of heated sheet material to a position between the platens and clamping means for presenting a plurality of limited areas of heated sheet material to a plurality of mandrels mounted on one of the platens for drawing heated material into female dies mounted on the opposite platen. The mechanism is designed to be operated in precision timed relation and is suitably actuated by hydraulic or mechanical means or a combination thereof. These details of the overall machine are incidental to the concept of the present invention and are set forth to describe the environment within which it will operate.

Previously, containers having undercuts or necked-down portions intermediate their extremities have been manufactured in dies which were split, generally axially, throughout their entire length. Such dies often present difficulties in that continued usage produces wear which prevents perfect mating and results in a poor product. Additionally, the positioning and control of moving parts require precision equipment which become both complex and costly.

An object of the present invention is to provide a novel method and apparatus for economically forming hollow articles or containers having restricted neck portions from a sheet of plastic material which overcomes the previously existing problems.

A specific object of the present invention is to provide a novel method and apparatus for forming vessels or containers with restricted neck portions wherein said apparatus includes at least three parts, one of which is solid and forms the base of a female die cavity and the movable remaining parts are split and form the upper portions of the die cavity containing the restriction or neck of the cavity.

Another object of the invention is to provide a female die for forming containers wherein the base of the die, forming the base and lower wall section of the container, is solid and remains fixed during the forming of the container.

A further object of the invention is to provide simple die means for the fabrication of containers having restricted neck portions wherein a given die can be readily adapted to accommodate the fabrication of a variety of sizes of containers.

Other objects of the invention will become apparent to those skilled in the art when the specification is read in conjunction with the accompanying drawings wherein:

FIG. 1 is a perspective view of one form of container manufactured in accordance with the method and apparatus of the type contemplated by the present invention;

FIG. 2 is an elevation in partial section showing the die apparatus as positioned immediately before the molding operation;

FIG. 3 is a fragmentary elevation similar to FIG. 2 showing the die at the commencement of the molding operation;

FIG. 4 is a fragmentary elevation in partial section showing the apparatus in an intermediate position during the molding operation;

FIG. 5 is a fragmentary elevation in partial section showing the die in closed position at the time of sealing the material to the upper rim or lip of the female die cavity;

FIG. 6 is a fragmentary elevation in partial section showing the final stage of the molding operation;

FIG. 7 is a fragmentary elevation in partial section showing the separation of the upper die portions and the ejection of the finished container; and FIG. 8 is a plan cross sectional view taken along lines 8—8 in FIG. 6

The present invention is concerned with the fabrication of plastic containers having restricted neck portions and more particularly, with a multi-part female die or mold for fabrication of such products with said die being used in a machine of the type generally disclosed in my Patent No. 2,962,758. As described above and in my patent, a thermoplastic sheet material is fed past heating means into position over a plurality of female dies, clamped in position in a limited area, drawn downwardly into each female die cavity by a mandrel supported by a die block fixed to a movable platen, sealed and clamped at the upper extremity of the female die by suitable means, a differential air pressure applied to the pre-drawn sheet material so that the sheet material moves into conformity with the interior configuration of the female die and then is subsequently ejected therefrom as a finished product. The sheet material used for the container is severed during the sealing operation with the remaining scrap being moved out of position over the female die subsequent to ejection of the finished product. This then is the basic process employed in conjunction with the present invention and hence, detailed description of the overall machine, other than is required to substantiate the disclosure of the present invention, can best be obtained by reference to my previously issued patents cited above.

A container of the type to be manufactured by the method and apparatus for the present invention is best seen in FIG. 1. Generically, it will include a bottom or base 12, the side walls 14 extending upwardly from the base and forming the body of the container, an inwardly directed or tapered upper portion 16, a neck or reduced portion 18 which has a smaller transverse dimension than the greatest transverse dimension of the body 14, and a lip or rim 20. Variations in the arrangement of the parts or in the specific design of the container can be made without departing from the spirit of the present invention. This container is shown solely as an example.

Referring now to FIGS. 2 through 7, the containers or other hollow articles are preferably formed from a continuous sheet of organic thermoplastic material such as polystyrene or modified polystyrene. Such a sheet of plastic material, which has been formed by extrusion, is fed, after being softened by heating, to a work station between two spaced platens which are relatively movable toward and away from one another. In the present disclosure the platens are generally shown by the arrows indicated as letters A and B.

When in position between the platens A and B, a restricted area of the heated material 24 is clamped on opposite sides by suitable means generally designated 26. A mandrel or plug 28 extending outwardly from platen A is positioned so as to act upon the area of material 24 within the clamping means 26. Coaxially on the opposite side of clamping means 26 from mandrel 28 there is located a female die cavity 30. This cavity is supported by the opposite platen B. In practice there are generally a plurality of mandrels 28 mounted on platen for cooperation with a like number of female die cavities 30 on opposite platen B. The present discussion will of course be restricted to just one of such cavities and mandrels.

The female die 30 is mounted, as is well known in the art, on a platen B, the reaction force of said platen B being generally designated by the arrows at the base of the die. The die includes a substantially continuous solid base 32 and complementary axially split upper portions 34–35 and 36–37. The base 32 is provided with a central aperture having a bushing 38 to accommodate a knock-out pin 40. As illustrated, the knock-out pin 40 is preferably provided with a head 42; the extremity or upper surface of the head 42 cooperating with the cavity 48 to impart the configuration desired in the bottom 12 and adjacent portions of the side walls 14 of the container to be formed in the die. A plurality of exhaust ports 44 are suitably arranged in the base 32 to provide egress of gases during the formation of the container by utilization of differentials in pressure, as best described hereinafter.

The split upper portions of the die can each be fabricated either as a single piece or as a plurality of pieces suitably joined together so as to act as an integral unit. In the disclosed embodiment the upper portions of the die, commonly designated 34–36 and 35–37 are each provided with complementary cavity means 50 and 52 respectively which provide the configuration for the middle and upper sections of the side wall 14. In addition, the portions 36–37 of the die each have an inwardly tapered portion 54, a neck portion 56 and a rim surface 58 which are utilized to form the taper 16, neck 18, and lip or rim 20 in the container, respectively. The upper die portions are suitably supported by a frame 60 having means such as pins or shaft 62 supported by the frame 60 and extending into suitable bores in the die 36. The die is normally maintained in an open position by suitable bias means such as springs 64. The two portions of the die 34–36 and 35–37 are maintained as an integral unit by means such as pins 51.

On opposite sides of the upper portions of the die there is provided an actuator 70. In the present instance the actuating means for closing the split die portions includes on each side a roller 72 rotatably pinned by shaft 74 to a bracket 76. A pair of cams 78 are provided for cooperation with the roller 72 to move the split die portions inwardly toward each other to form the restricted or neck portion of the total die cavity.

In the operation of this apparatus the heated plastic sheet material is drawn downwardly by the mandrel 28, as shown in FIG. 3, into entering relationship relative to the die cavity. The mandrel 28 is hollow and is mounted on platen A by means of a die block 86 and is suitably fastened thereto by means such as screw 88. The die block 86 is provided with air ports 90 which are connected to a suitable supply of pressurized air and feed into distributing ports 92 and thence through the hollow mandrel for exit through mandrel ports 94. The die block 86 has a depending flange 87 which is complementary in shape to the external configuration of rim surface 58, for purposes best set forth hereinafter.

As seen in FIG. 4, the mandrel progresses downwardly, as viewed in the drawings, stretching the limited area of material within the clamping means 26. Just prior to the flange 87 contacting rim surface 58, the cams 78 are actuated and through engagement with rollers 72 move the upper die sections into cooperating position with the base 32 to form the desired configuration of the cavity. With the cams 78 holding the upper die portions 34–36 in closed relationship the mandrel 28 and die block 86 are brought to their final position. The flange 87 of die block 86 cooperates with rim surface 58 to sever the predrawn material from the sheet and to clamp the drawn material between the die block 86 and die 30, as shown in FIG. 5, in the fashion contemplated by my prior patents. At this point air pressure is applied through ports 94 to the interior of the predrawn sheet and to force the warm material outwardly against the configuration of the cavity of the female die. The air within the die egresses through ports 44. The air under pressure also effects rapid cooling of the material so that as soon as the plastic material has been forced against the walls of the mold cavities, the air under pressure may be shut off and the mandrels 28 may be raised. At this point the cams 78 are retracted permitting the springs 64 to move the split die portions outwardly. As the die opens the knock-out pin 40 is elevated in timed relation to the withdrawal of the mandrel 28 raising the container 10 above the upper limits of the die where suitably directed jets of air may be utilized to move the finished container from the confines of the machine.

It will be noted that the base 32 of the die has remained relatively fixed during the entire operation. In addition to providing a simple semi-rigid die capable of forming an ideal container, the present invention also contemplates a die having a high degree of adaptability. As was indicated before, the upper split die portions 34–36 and 35–37 forming the upper portions of the container wall as well as the reduced neck portion, can be fabricated either as single pieces or as a plurality of pieces. In the event that a manufacturer should desire to change the volume of the container 10 to be fabricated in the die it is merely necessary to increase or decrease the axial extent of the upper die portions rather than having to change the entire female die block. Thus, it is possible to insert various sized mid sections 34 and 35 to attain these variations in volume of the finished container produced therein. Alternatively, if the upper die portions are each a single piece, then one piece units would be utilized to replace each of the complementary split portions. It will be recognized of course that if the depth of the die is increased that to compensate for this there will have to be a corresponding increase in material thickness and an increase in mandrel length as well as adjustment of cam arms 78. The variations possible by having a standard base and differing top sections are limited solely by the imagination of the designer when utilizing the teachings of this invention.

While mechanical means have been shown in the disclosed embodiment for the actuation of the die portions, it will be recognized that other techniques of die operation, such as hydraulics, are available and can be used without departing from the spirit of the present invention.

While one embodiment of the present invention has been shown and described hereinabove it is obvious that many details may be changed without departing from the spirit and scope of the appended claims.

I claim:

1. An apparatus for forming thin wall hollow articles such as containers which have the characteristics of a reduced neck portion intermediate the bottom and open end of a container, including a mold having at least three relatively movable portions which when moved to a molding position provide an open end mold cavity of the shape of the container to be formed, the first of said mold portions having an opening therein of frusto-conical configuration with the small end of the frustum of the cone providing a bottom surface on which the bottom of the container is formed, the side walls of said opening diverging from said bottom surface and adapted to form a portion of the container side wall in the vicinity of said aforementioned bottom, second and third portions of said mold positioned adjacent to and extending beyond said first portion and in the vicinity of said first mold portion providing an opening of the same size as said opening in said first mold portion but converging in a direction away from said first mold portion to provide a reduced transverse measurement to form the aforementioned reduced neck portion of the container, said second and third mold portions each providing substantially one half of the surface which the upper wall portion of said container is formed, said second and third mold portions being split in a direction substantially normal to the bottom forming surface of said first mold portion and movable toward and away from each other, means for supporting a heated sheet of thermoplastic material adjacent said mold transverse of said cavity and aligned therewith, a mandrel disposed opposite to said mold cavity, means for advancing said mandrel against said sheet and into said mold cavity to draw material from said sheet into said cavity to form a partially completed article, means for sealing off said partially completed article at the open end of said cavity, means for establishing a differential of fluid pressure across the material of said partially completed article there being a greater pressure within than without said sealed off partially completed article whereby to further form said article substantially to completion against the interior of said mold cavity, means for moving said second and third mold portions relative to each other and means for ejecting said substantially finished article from said first portion of said mold when said second and third portions of the mold are in a separated position.

2. An apparatus of the type claimed in claim 1 wherein annular means are provided at the open end of said second and third portions of the mold for the purpose of forming a rim on a container at its open end and means for cutting said container from said sheet material while said container is in said mold cavity.

3. An apparatus of the type claimed in claim 1 wherein said mold includes three portions, said first portion forming a container bottom of a predetermined diameter and a portion of the adjacent side wall of said container, said second and third portions when joined having a diametral extent at the reduced neck portion substantially less than the diameter of said base or side wall but being capable of sufficient lateral movement to pass said base and side wall of the container through said reduced neck portion of the mold when the second and third portions are separated by oppositely directed lateral movement.

4. An apparatus of the type claimed in claim 3 wherein the first portion of the mold is provided with a knock-out plug, the upper surface of which forms a substantial portion of the base of the completed article.

5. Apparatus for forming hollow articles having reduced neck diameters such as containers and the like from thermoplastic sheet material including a three piece mold having a base portion having a cavity therein with a bore extending downwardly from the base of the cavity, a knock-out pin having a head adapted to be accepted within the cavity of said base portion and attached to a rod axially movable within said bore, two or more upper mold portions movable relative to said base portion in a generally lateral direction, the movable portions and base portion when joined forming a cavity in the shape of an article having a reduced neck portion, an upstanding annular rim formed about the cavity with said movable portions and base portion are in closed relationship, means for clamping a restricted area of a heated sheet of thermoplastic material adjacent said mold transverse of said cavity and aligned therewith, a mandrel disposed opposite and in line with said mold cavity, means for advancing said mandrel against said sheet and into said mold cavity to draw material from said clamped area of the sheet to form a partially completed article, means for drawing said plastic sheet over and around said upstanding annular rim and for simultaneously clamping the part so drawn, means sealing off the partially completed article adjacent said rim, means for establishing differential fluid pressure across the drawn material with greater pressure being within the partially completed article whereby it is expanded into substantial completion against the interior of said multiple piece mold cavity, means for cutting said article from said sheet immediately adjacent said rim with said article in said mold cavity, means for moving the movable portions of said mold laterally whereby movement of said knock-out pin and associated head will eject the completed article having the reduced neck diameter from the mold cavity, said movable portions being laterally moved a sufficient amount relative to the base and said knock-out pin whereby that portion of the movable mold portions forming the reduced neck portion will be spaced apart a distance in excess of the greatest diameter of the article so formed.

6. An apparatus of the type claimed in claim 5 wherein said mold includes four or more portions, including a base portion, at least two laterally movable portions which when joined form the reduced neck portion of the article and one or more portions which may be interposed between the base portion and the movable portions whereby containers having the same general configuration but of differing axial lengths may be readily fabricated from a single movable mold.

References Cited by the Examiner

UNITED STATES PATENTS

| | | |
|---|---|---|
| 265,540 | 10/1882 | Robinson et al. |
| 488,570 | 12/1892 | Miller. |
| 656,505 | 8/1900 | Brannagan. |
| 923,585 | 6/1909 | Sehacht _____ 18—42 |
| 2,781,551 | 2/1957 | Richerod _____ 264—94 |
| 2,839,788 | 6/1958 | Dembrals _____ 18—42 XR |
| 2,891,280 | 6/1959 | Politis _____ 18—19 XR |
| 2,985,914 | 5/1961 | Miller _____ 18—19 |
| 3,072,964 | 1/1963 | Tilden _____ 18—19 |
| 3,105,270 | 10/1963 | Fibish _____ 18—19 |
| 3,121,916 | 2/1964 | Edwards _____ 18—19 |
| 3,126,583 | 3/1964 | Haeberle _____ 18—19 |
| 3,170,970 | 2/1965 | Adams _____ 264—94 |

FOREIGN PATENTS

| | | |
|---|---|---|
| 1,227,505 | 3/1960 | France. |
| 1,238,420 | 6/1960 | France. |

WILLIAM J. STEPHENSON, *Primary Examiner.*

ROBERT F. WHITE, M. R. DOWLING,

*Assistant Examiners.*